United States Patent [19]

Fassnacht et al.

[11] Patent Number: 5,774,581
[45] Date of Patent: Jun. 30, 1998

[54] DEVICE FOR SEGMENTING A DISCRETE ASSEMBLY OF DATA

[75] Inventors: Carola Fassnacht, Hamburg, Germany; Pierre Alain Devijver, Brest, France

[73] Assignee: U.S. Philips Corporation, New York, N.Y.

[21] Appl. No.: 532,670

[22] PCT Filed: Feb. 3, 1995

[86] PCT No.: PCT/IB95/00076

§ 371 Date: Oct. 12, 1995

§ 102(e) Date: Oct. 12, 1995

[87] PCT Pub. No.: WO95/22806

PCT Pub. Date: Aug. 24, 1995

[30] Foreign Application Priority Data

Feb. 16, 1994 [FR] France .................................. 94 01769
Dec. 7, 1994 [FR] France .................................. 94 14726

[51] Int. Cl.$^6$ ....................................................... G06K 9/34
[52] U.S. Cl. ........................... 382/180; 382/171; 382/228
[58] Field of Search .................................... 382/173, 180, 382/171, 172, 164, 224, 228, 286, 288

[56] References Cited

U.S. PATENT DOCUMENTS 4,847,786   7/1989   Wang et al. ............................. 382/171
5,239,596   8/1993   Mahoney ................................. 382/180

OTHER PUBLICATIONS

"Segmentation of Textured Images Using a Multiresolution Approach" by C. Bouman and B. Liu, 1988 International Conference on Acoustics, Speech and Signal Processing, Published in Reports of this Conference, vol. 2, pp. 1124–1127.

Primary Examiner—Leo Boudreau
Assistant Examiner—Phuoc Tran
Attorney, Agent, or Firm—Laurie E. Gathman

[57] ABSTRACT

Device for segmenting data corresponding, for example to image sites, for transmitting and/or storing these images at a low rate. This device comprises a sub-assembly for initial segmentation into classes, supplying an initial set of labels. In two parallel paths (201, 202), a sub-assembly (200) determines conditional probabilities, notably on the basis of a propagation factor L whose parameters are defined by specific relations. These probabilities are used in a labelling sub-assembly (300) which supplies a new set of labels. Finally, a sequencing sub-assembly (400) determines the replacement of the initial set of labels at the input of the sub-assembly (200) by the new set and continues or, in contrast, discontinues this iterative process of determining new labels.

8 Claims, 3 Drawing Sheets

5,774,581

DEVICE FOR SEGMENTING A DISCRETE ASSEMBLY OF DATA

BACKGROUND OF THE INVENTION

The invention relates to a device for segmenting a discrete assembly of data corresponding to sites (m,n), with m being between 1 and M inclusive and n being between 1 and N inclusive, based on digital input signals corresponding to said data. This invention is particularly applicable in the field of image segmentation for realising, for example videophone-type transmissions or for treating images supplied by satellites or images obtained in the medical field or for composite pictures, and thus relates to all sorts of images of the conventional type or images taken from a distance (between the pick-up device and the object of the scene which is most proximate), as well as images for distributing grey levels, and texture images or images combining several types of structures.

Every image segmentation process is used for classifying, i.e. regrouping the pixels by assigning a common label to them per region obtained from the segmentation. Such an operation consists of constructing a model from observable data, which model facilitates subsequent treatments. However, rather than constructing a deterministic model, it is preferred to search and then evaluate probabilities relating to situations which are reflected by these observable data with a likelihood which is the mark of the degree of confidence in this particular interpretation. In setting up such a non-deterministic model, it cannot be excluded that in the searched classification each pixel is influenced by the class of relationship with its neighbours. Based on this hypothesis, it has been contemplated to consider the assembly of pixels of an image as a Markov field (i.e. as the generalization of a Markov chain).

The article "Segmentation of textured images using a multiresolution approach" by C. Bouman and B. Liu at the "1988 International Conference on Acoustics, Speech and Signal Processing" (held in New York USA from 11 to 14 Apr. 1988) and published in the "Reports" of this Conference, Volume 2, pp. 1124–1127, presents a method of segmenting images based on an approximated estimation of the maximum value a posteriori of a random Markov field, on the basis of the hypothesis that an a priori distribution of labels assigned to pixels is given by a Gibbs distribution. This method proceeds through segmentations which are increasingly more precise and the process of segmentation with a growing image resolution is interrupted when each pixel can be assigned to a class.

SUMMARY OF THE INVENTION

It is an object of the invention to provide a device for segmenting data and notably digital signals corresponding to images, with which a segmentation method is carried out which also makes use of a model by way of a Markov field but is based on a different approach and leads to an optimum result with very few iterations.

To this end, the invention relates to a segmentation device which is characterized in that it comprises, in series:

(A) a sub-assembly for initial segmentation by extracting the histogram, computing the average values from T classes and classification by searching that average value which is most approximate to the computed signal;

(B) a sub-assembly for determining and updating probabilities, receiving said labels on the one hand and said digital input signals on the other hand and comprising:

(1) at the output of said initial segmentation sub-assembly, a first path for determining conditional probabilities p(q/a,b,c), comprising in series:

(a) a circuit for determining configuration probabilities interpreting the identity or non-identity of the levels corresponding to each of the fifteen possible configurations within a bidimensional square model (q,a,b,c) of a Markov chain, q being referred to in said segmentation assembly as the label to be determined at the "infant" site, and a, b, c being referred to as the labels of the "parent" sites;

(b) a circuit for computing propagation coefficients for the Markov chain model thus chosen;

(c) a first circuit for determining the conditional probability p(q/abc)=exp L(q/abc)/Z(abc), in which Z is a normalization factor and in which L(q/abc) is a factor propagating the influence from the parents to the infants, defined by the expressions (3) to (14):

$$L(q/abc) = B(v) \cdot d(qa) + B(d) \cdot d(qb) + B(h) \cdot d(qc) + \quad (3)$$
$$B(v,d) \cdot d(qab) + B(d,h) \cdot d(qbc) +$$
$$B(v,h) \cdot d(qac) + B(v,d,h) \cdot d(qabc)$$

$$\exp B(v) = k \cdot S(1123) \quad (4)$$

$$\exp B(d) = k \cdot S(1213) \quad (5)$$

$$\exp B(h) = k \cdot S(1231) \quad (6)$$

$$\exp B(v,d) = c(v,d) \cdot (\exp \cdot B(h) + T - 2) \cdot \exp (B(v) + B(d)) \quad (7)$$

$$\exp B(v,h) = c(v,h) \cdot (\exp \cdot B(d) + T - 2) \cdot \exp (B(v) + B(h)) \quad (8)$$

$$\exp B(d,h) = c(d,h) \cdot (\exp B(v) + T - 2) \cdot \exp (B(d) + B(h)) \quad (9)$$

$$\exp B(v,d,h) = \frac{(T-1) \cdot S(1111)/S(1222)}{\exp(B(v) + B(d) + B(h) + B(v,d) + B(v,h) + B(d,h))} \quad (10)$$

$$c(v,d) = S(1112)/(S(1221) + S(1223)) \quad (11)$$

$$c(v,h) = S(1121)/(S(1212) + S(1232)) \quad (12)$$

$$c(d,h) = S(1211)/(S(1122) + S(1233)) \quad (13)$$

$$k = (T - 3)/S(1234); \quad (14)$$

(2) also at the output of the initial segmentation sub-assembly and in parallel with the first path, a second path for determining conditional probabilities $p_q(x_{mn})$, comprising in series:

(a) a circuit for computing "average" parameters and "variance" parameters of said T classes, (b) a second circuit for determining conditional probabilities;

(C) at the output of said sub-assembly for determining and updating probabilities, a sub-assembly for labelling pixels of said assembly of data, receiving the output signals of said first and second paths at first and second inputs and the digital input signals of the device at a third input, said circuit being provided to supply a new set of labels which constitutes the update of said initial segmentation;

(D) between the two sub-assemblies for initial segmentation and determining and updating probabilities, a sequencing sub-assembly whose first and second inputs receive the set of initial labels obtained in accordance with said initial segmentation and the set of labels resulting from the update, respectively, and comprising in series:

(1) a circuit for comparing said sets of labels;

(2) in accordance with the result of said comparison, a circuit for discontinuing the process of segmentation or, in contrast, for a new update, for substituting said updated set of labels for said initial set of labels, said updated set of labels being applied to the input of said first and second paths.

In a particular embodiment, said discrete assembly comprises unimodal data and the initial segmentation sub-assembly receiving said input signals comprises in series:
(1) a circuit for extracting the histogram of levels having a value expressed by these input signals and corresponding to each point of said assembly;
(2) based on said histogram, a circuit for computing the average values from T classes corresponding to T previously selected characteristics of said discrete assembly, the predetermined number T being supplied to said computation circuit;
(3) a circuit for classifying by searching, for all the points of said discrete assembly, that average value of the T computed average values which is most approximate to the level of each signal and corresponding regrouping of said points, said classification circuit supplying labels which indicate that class to which each point belongs in accordance with said initial segmentation.

In another embodiment, said discrete assembly comprises multimodal data for which the digital input signals corresponding to said data are regrouped in C channels, and said initial segmentation sub-assembly receiving said input signals comprises in series:
(1) a unimodal segmentation stage receiving, among said input signals, the signals associated with M×N data which correspond to one of the C channels, and comprising in series:
  (a) a circuit for extracting the histogram of levels having a value expressed by these input signals and corresponding to each point of said assembly;
  (b) based on said histogram, a circuit for computing the average values from T classes corresponding to T previously selected characteristics of said discrete assembly, the predetermined number T being supplied to said computation circuit;
  (c) a circuit for classifying by searching, for all the points of said discrete assembly, that average value of the T computed average values which is most approximate to the level of each signal associated with the data corresponding to each point and subsequently by corresponding regrouping of said points, said classification circuit supplying labels which indicate that class to which each point belongs in accordance with the unimodal segmentation;
(2) a sub-assembly for updating said unimodal segmentation, comprising in series:
  (a) a circuit for updating said computation of average values from the T classes, receiving the output signals from said classification circuit and the signals associated with the M×N×(C−1) other data corresponding to the (C−1) other channels;
  (b) a circuit for updating said classification, supplying labels which indicate that class to which each point of said discrete assembly belongs in accordance with the initial segmentation.

In accordance with a preferred embodiment of the device, the "variance" parameters are defined by the expression:

$$V^2_{qj}=\Sigma_{(s/l(s)=q)}(x_{sj}-M2_{qj})^2/Nq$$

in which j=1 to C is the channel index, $x_{sj}$ is said level of the value for the channel j at a given site s, l(s) is the label attributed to this site s, $M2_{qj}$ is the average of each channel j independently, and Nq is the total number of sites to which the label q is attributed.

In accordance with a variant of the device, the "variance" parameters are the elements of the matrix of co-variances for the different channels, defined by the following expression:

$$V_{qj1j2}=\Sigma_{(s/l(s)=q)}(x_{sj1}-M2_{qj1})(x_{sj1}-M2_{qj2})/Nq$$

in which j1,j2 denote the indices of the two channels concerned, $x_{sj}$ is said level of the value for the channel j at a given site s, l(x) is the label attributed to this site s, $M2_{qj}$ is the average of each channel j considered independently, and Nq is the total number of sites to which the label q is attributed.

In either case, an advantageous arrangement in this device is to apply the output signal of the sub-assembly for updating the unimodal segmentation to its input so as to realise a new classification, until this iterative process is interrupted in accordance with a given convergence criterion.

In whichever way this device is realised, a preferred embodiment of the invention is characterized in that the labelling sub-assembly comprises in series:
(1) a memory for conditional probabilities supplied by said first and second paths and intermediate probabilities determined internally to said labelling sub-assembly;
(2) a circuit for computing values which are equal or proportional to the marginal probabilities of each label for each site, said computation being performed in accordance with the following steps, for all the possible q, a, b, c:
  (a) $F_{mn(q)}$ is defined as the conditional probability $p(q/X_{mn})$ of having a label q at the site (m,n), the reference $X_{mn}$ designating the assembly of sites situated above and at the left of the site (m,n);
  (b) for each b, the value $F=F_{m-1,n-1}(b)$ is examined only for taking into account whether it is higher than a given threshold;
  (c) then the following expression is computed:

$$H=Y_{m-1,n}(a,b)\cdot Z_{m,n-1}(c,b)\cdot p(q/a,b,c)\cdot p_q(x_{mn})/F$$

in which:

$$Y_{m-1,n}(a,b)=p(a,b/X_{m-1,n})$$

and:

$$Z_{m,n-1}(c,b)=p(c,b/X_{m,n-1})$$

and an accumulated addition of the values of H is effected for obtaining a value J and a value $L_{m-1,n-1}(b)$;
  (d) the steps (b) and (c) are repeated until all the sites have been treated in a similar manner, the cumulated value of J being added to $Y_{m,n}(q,c)$ and to $Z_{m,n}(q,a)$ and subsequently reset to zero, and the cumulated value of $L_{m-1,n-1}(b)$ constituting said value which is equal or proportional to the marginal probability of the label b at the site (m-1,n-1);
  (e) the steps (b) to (d) are repeated until all the combinations (q,a,c) have been treated in a similar manner;
(3) a circuit for labelling sites by comparing the values of $L_{m-1,n-1}(b)$ and attributing to each site (m-1,n-1) the label b corresponding to the largest value of $L_{m-1,n-1}(b)$.

In the latter embodiment, an advantageous variant is characterized in that in the circuit for computing values which are equal or proportional to the marginal probabilities of each label for each site, step (c) includes a supplementary normalization step ($c_2$) by dividing all the values of Y and Z by a norm $N_{m,n}$ which for all the labels b is equal to $\Sigma_b L_{m-1,n-1}(b)$.

These and other aspects of the invention will be apparent from and elucidated with reference to the embodiments described hereinafter.

DETAILED DESCRIPTION OF THE PREFERRED EMBODIMENTS

Figure 1:
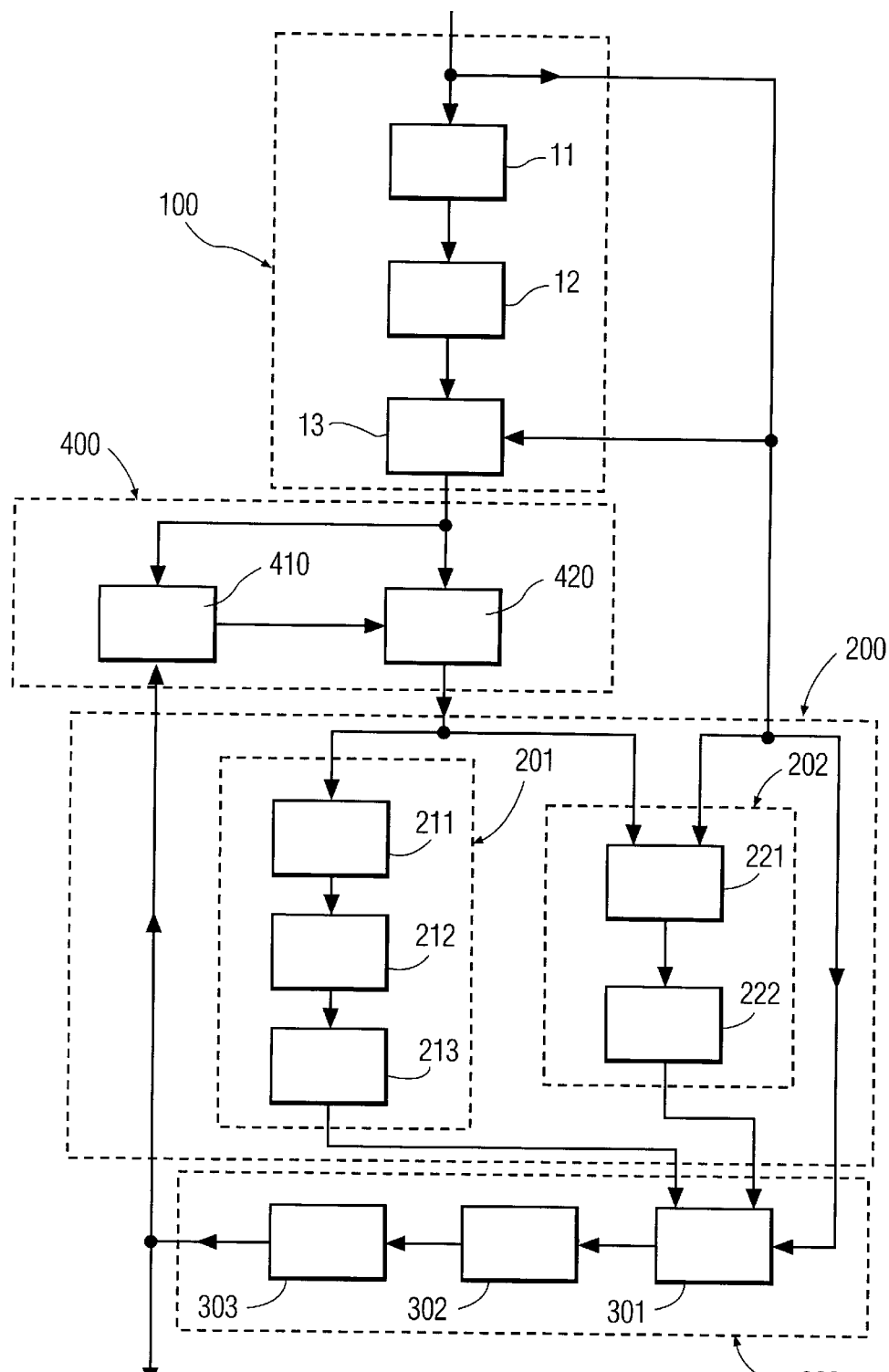
FIGS. 1 and 4 show two embodiments of the device according to the invention.

Before describing examples of applying the invention to the segmentation of images in greater detail, it should be noted that in such an application the images to be segmented have been derived by means which are not within the scope of the present invention and which are directly dependent on the application. The images may be transmitted via satellites, or obtained with the aid of medical apparatus, etc., but they may also be the result of a pretreatment such as, for example in the case of textured images in which each pretreated image corresponds to vectors containing, for each site, texture characteristics which have previously been derived from the original image. In all cases, these images are available in the form of digital signals at the input of the device described. In the embodiment described with reference to FIG. 1, these signals correspond to unimodal data and in the embodiment described with reference to FIG. 4, these signals correspond to multimodal data regrouped in C channels denoted by j=1, 2, . . . , C.

In the sequence of successive images, each digital image is thus defined with the aid of a bidimensional network of coordinate points (x,y), or sites s (m,n) with m=1 to M and n=1 to N with which vectors referred to as observables I(x,y) are associated and quantized, for the component j of each vector, in $V_j$ distinct values (for example, from 0 for the point(s) which are darkest to 255 for the point(s) which are clearest), which are regularly spaced in general and belong to an assembly $G_j = g_1, g_2, g_3, \ldots, g_{vj}$. The segmentation of such an image consists in defining regions in this image either by reducing the number of quantization values of the observable vectors with the aid of a transform technique which eliminates the redundant information among the initial data so that only the essential information is preserved, or, in the case of textures, by subdividing the image into regions which are spatially coherent in accordance with certain criteria of homogeneity.

To respect the mathematical formalism which is generally adopted when a Markov field model is used (the theories concerning this model formation will be carried into effect in the following description), it will hereinafter be assumed that each image X of the sequence of input images is associated with an assembly S of sites which correspond to the localization of each pixel. Each site i belongs to this assembly S which comprises M rows×N columns.

The segmentation of an image consists in associating a label with each pixel of this image, which label will be written as l(m,n), in which m and n denote the current row and the current column of the pixel considered, thus denoting a given site associated with this pixel. These labels provide the possibility of classifying each pixel in a given region of the image on the basis of a particular property or properties recognized as being common for the region considered. It should be noted that these labels are not directly observable or measurable from input signals which are representative of images and that it is thus necessary to determine them. Within the scope of the present invention, the number of classes, denoted, for example T, must be predefined by the user, with T being an arbitrary integer. For example, when classifying regions on the basis of images supplied by satellites, one will be inclined to define T as being the number of different types of regions which are known a priori. Similarly, in medical imaging, one will choose the number of types of tissue present in the part of the body represented by the image.

In a first embodiment shown in FIG. 1, which corresponds to a segmentation based on unimodal digital data (i.e. vectors of unimodal, observable data I(x,y)), the segmentation device according to the invention comprises an initial segmentation sub-assembly 100. This sub-assembly 100, which receives the digital signals which are representative of each image to be segmented, comprises in series a circuit 11 for extracting the histogram of the observable values I(x,y), a circuit 12 for computing average values from T classes corresponding to T image characteristics selected for the segmentation, and a classification circuit 13.

This sub-assembly 100 is realised as follows. As a function of the importance of the segmentation searched in the application considered, a certain number T of classes is chosen which corresponds to T given characteristics, for example T classes corresponding for satellite images to forests, fields, lakes, etc., or for medical images to different types of body tissue (for example T=8 will be taken in the following description).

The histogram of observable data I(x,y) extracted by means of the circuit 11 is applied to the circuit 12 which divides the histogram into 2T zones in the following manner. The histogram is divided into T zones of equal surface and then in each of these T zones its average value M1(T) is determined. This subdivision consists of dividing the histogram into 2T zones of equal surface defined by (2T+1) observable values g(0), g(1), g(2), . . . , g(2T-1), g(2T), and of taking the values g(1), g(3), . . . , g(2T-3), g(2T-1) as average values.

With these T average values now being determined, the classification circuit 13, which receives the output signals from the circuit 12 and the (M×N) digital input signals from the device, searches the most proximate average value for each pixel (of site i) of the image. To this end, this circuit 13 determines the value |g(x)−M1(T)|. In this expression g(x) is the quantized value of the pixel considered and M1(T) successively takes the T possible values (here, with T=8, each pixel is thus in the range of one of the T=8 classes considered) and the label corresponding to each pixel will be referred to as l(CL) where the index CL may take T distinct values. This label l(CL) determined for each pixel of the image defines a first segmentation of the image which will be referred to as initial segmentation. The M×N labels thus defined constitute the (M×N) output signals of the sub-assembly 100 for initial segmentation.

This sub-assembly 100 is followed by a sub-assembly 200 for updating the probabilities, which sub-assembly receives the (M×N) input signals of the device and the (M×N) labels determined by the sub-assembly 100 and, as will be evident hereinafter, supplies conditional probabilities p(q/abc) and $p_q(x)$, respectively. To this end, this sub-assembly 200 comprises, in parallel, first and second paths 201 and 202 for determining these conditional probabilities, which determination is realised as follows.

If the past of a site s in an image is understood to be any assembly of sites having a lower index, (i.e., for example for scanning an image of the television type, the assembly constituted by the sites already scanned on the same line as this site s and the sites of all the upper lines), the density of probability related to the assembly L of possible labels l is expressed in the form of a product (effected for all the sites) of probabilities of having the label l(s) at the site s=(m,n), which probabilities are conditional to the past of this site. The property of a unilateral Markov field takes shape in the following manner: these conditional probabilities (or transition probabilities) do not depend on all the labels of the past of this site but only on labels of a limited number of sites associated with this past. This limited number of sites, which is referred to as the sub-assembly of parents of s, defines the order of the Markov field thus constituted and the site s itself will hereinafter be referred to as the infant site of its parents.

Figure 2:
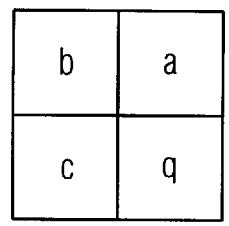
FIG. 2 shows an example of a Markov chain of the order 3.

In the embodiments described, only a model of the order 3 will be described, i.e. the probability p(l(m,n)) of obtaining a label l(m,n) at a site i(m,n) situated at the intersection of the mth row and the nth column only depends on probabilities determined in a similar manner for the sites i(m-1,n), i(m-1,n-1), i(m,n-1), with m and n being higher than 1. FIG. 2 shows such a model of the order 3: for simplifying the notations, the reference q denotes the label of the site i (or "infant" site) and the references a, b, c denote the labels of the three other sites (or "parent" sites). With such an example of the order 3 and in the case where all the conditional probabilities are presupposed to be non-zero, the expression of conditional probability (or of transition probability) may be noted in an exponential form with the aid of a function (or factor) L(q/abc). L is referred to as a propagator because this factor propagates an influence from the parents to the infants. Then:

$$p(q/a,b,c) = \exp L(q/a,b,c)/Z(a,b,c) \quad (1)$$

The denominator Z is simply a factor of normalization:

$$Z(a,b,c) = \sum_u \exp L(u/a,b,c), \quad (2)$$

in which the sum $\Sigma$ over u is effected for the T label values. Thus, with Z the constraint of normalization can be ensured (the equation $\Sigma u\ P(u/a,b,c)=1$ for all the sites must be verified). In the approach made here, the propagator L(q/a,b,c) is defined by the following expression (3):

$$L(q/a,b,c) = B(v) \cdot d(q,a) + B(d) \cdot d(q,b) + B(h) \cdot d(q,c) + \\ B(v,d) \cdot d(q,a,b) + B(d,h) \cdot d(q,b,c) + \\ B(v,h) \cdot d(q,a,c) + B(v,d,h) \cdot d(q,a,b,c) \quad (3)$$

In this expression, v, d, h denote the parent site which is vertical, diagonal or horizontal to the infant site i, the references B(.) are independent parameters constituting propagation coefficients and the references d(.) are equal to 1 if the labels corresponding to the indices between parentheses are identical, or else are 0. In the propagator thus defined, the seven values B(.) which represent the parameters of the Markov model, characterize the tendency of an infant site to receive the same label as its parents: thus, if, for example the constant B(v) is positive and large, the infant site will have a strong tendency to have the same label as its vertical parent.

Figure 3:
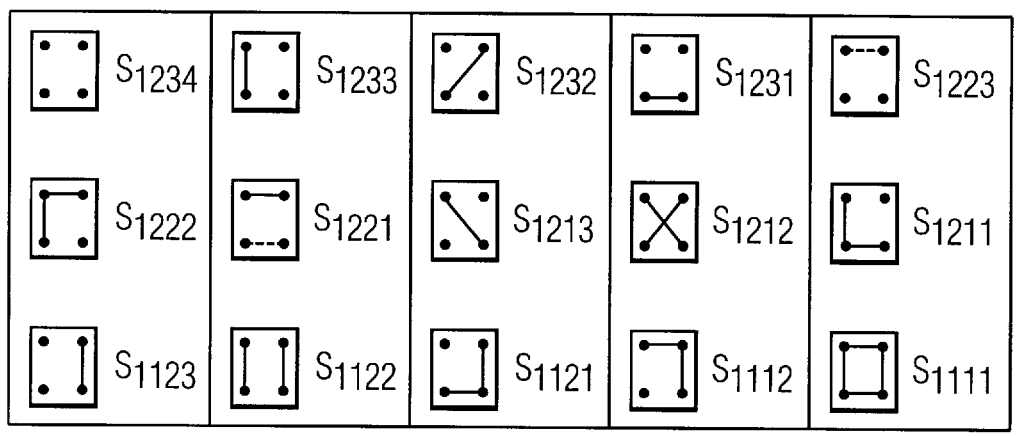
FIG. 3 shows in this case the different possible configurations in which the pixels connected by a solid line, and only these pixels, are identical.

The knowledge of the probability p(q/a,b,c) thus depends on that of the propagator L, i.e. on that of the parameters B(.). It can then be shown that the knowledge of these parameters depends on that of the probabilities of the configuration within the Markov chain model chosen (shown in FIG. 2). These configuration probabilities are denoted S(1234), S(1233), S(1232), S(1231), S(1223), S(1222), S(1221), S(1213), S(1212), S(1211), S(1123), S(1122), S(1121), S(1112), S(1111), respectively. The significance of these values S(.) in the case of the model shown in FIG. 2 is visualized in FIG. 3 which associates the corresponding configuration with each configuration probability S(.), namely that for which the pixels connected by a solid line, and only these pixels, are identical. These configuration probabilities are determined by simply counting the number of times when a given configuration appears in the image concerned.

This count is realised in the first path 201 which to this end comprises a circuit 211 for determining these configuration probabilities S(.) in the segmented image which is present at the output of the sub-assembly 100. This circuit 211 is followed by a circuit 212 for computing the propagation coefficients B(.). As is evident from the foregoing, the knowledge of these coefficients depends on that of the probabilities S(.). Without giving all the reasons which provide the possibility of establishing this dependence, only the relations (4) to (14) will be given here, which connect the values B(.) and the values S(.) and which are as follows when the number T is higher than or equal to 4:

$$\exp B(v) = k \cdot S(1123) \quad (4)$$

$$\exp B(d) = k \cdot S(1213) \quad (5)$$

$$\exp B(h) = k \cdot S(1231) \quad (6)$$

$$\exp B(v,d) = c(v,d) \cdot (\exp \cdot B(h) + T - 2) \cdot \exp (B(v) + B(d)) \quad (7)$$

$$\exp B(v,h) = c(v,h) \cdot (\exp \cdot B(d) + T - 2) \cdot \exp (B(v) + B(h)) \quad (8)$$

$$\exp B(d,h) = c(d,h) \cdot (\exp B(v) + T - 2) \cdot \exp (B(d) + B(h)) \quad (9)$$

$$\exp B(v,d,h) = \frac{(T-1) \cdot S(1111)/S(1222)}{\exp(B(v) + B(d) + B(h) + B(v,d) + B(v,h) + B(d,h))} \quad (10)$$

$$c(v,d) = S(1112)/(S(1221) + S(1223)) \quad (11)$$

$$c(v,h) = S(1121)/(S(1212) + S(1232)) \quad (12)$$

$$c(d,h) = S(1211)/(S(1122) + S(1233)) \quad (13)$$

$$k = (T - 3)/S(1234), \quad (14)$$

Where T=3, the equations (4) to (14) are to be verified, but the value of k is arbitrary (any value of k gives rise to the same value of L(q/a,b,c) and thus leads to identical segmentations). For example, k may be chosen to be such that B(v)+B(d)+B(h)=0, which implies that k is equal to the third root of 1/S(1123)×S(1213)×S(1231) but any other choice of k is also possible. Similarly, where T=2, any value of k gives rise to the same values L(q/a,b,c) and thus to identical segmentations. With the coefficients B(.) thus being determined, a circuit 213 arranged in series with the circuits 211 and 212 determines the conditional probability (or the transition probability) p(q/a,b,c) in conformity with expression (1).

Like the first path, the second path 202 receives the (M×N) output labels from the sub-assembly 100 and applies them to a circuit 221 for computing the class parameters (here average values and variances). The circuit 12 has effected a first computation of average values for T classes but these classes have been constituted in an arbitrary manner by dividing the histogram of the observable values into T zones for the initialization of the operation of the segmentation device. This arbitrary initial segmentation is now replaced at the output of the sub-assembly 100 by a segmentation which is from now on responsive at least approximately to a classification criterion and for each of the T classes responsive to T possible labels for the pixels, it is thus possible to effect a new computation of the average, denoted M2(T), as well as the computation of the corresponding variance (squared), denoted V2(T). The T values M2(T) and the T values V2(T) thus computed are the 2T output signals of the circuit 221.

These 2T signals are applied to a circuit 222 for determining the conditional probability of a grey level x for a label q found at a site i. It is known that the final segmentation must be in accordance with the initial data which result from an observation or a measurement. If unimodal observable data I(x,y) are concerned, this conditional probability denoted $p_q(x)$ is given for each class by the following expression (15):

$$p_q(x) = \frac{1}{V2(T)\sqrt{2\pi}} \cdot \exp\frac{(x - M2(T))^2}{2V2(T)^2} \quad (15)$$

The conditional output probabilities of the two paths 201 and 202, present at the output of the circuits 213 and 222, constitute the two types of output signals of the sub-assembly 200 for updating the probabilities and are applied to two corresponding inputs of a sub-assembly 300 for labelling the pixels. A third input of this sub-assembly 300 also receives the (M×N) digital input signals of the device and determines marginal probabilities, based on which new labels l(.) defining a new segmentation of the image are determined in their turn. These marginal probabilities are determined as indicated below in the description of the operation of the sub-assembly 300.

First of all, several notations will now be repeated. The site which is momentarily treated is the site (m,n), with m being between 1 and M inclusive and n being between 1 and N inclusive. The part of the image which is situated above and to the left of the site (m,n) is denoted $X_{mn}$. The conditional probability $p(q/X_{mn})$ of having the label q at the site (m,n) is denoted $F_{mn}(q)$. The notation $p(q,a,b,c/X_{mn})$ designates the searched marginal probability of having the labels $l_{m,n}=q$, $l_{m-1,n}=a$, $l_{m-1,n-1}=b$, $l_{m,n-1}=c$ at the corresponding sites.

The determination of $p(q,a,b,c/X_{mn})$ for each site is realised as follows, with the data used for the sub-assembly 300 being the following: the conditional probabilities $p_q(x)$ supplied by the path 202 (for which the assembly of the x values for each site m,n corresponds to the assembly of observable data I), the conditional probabilities p(q/a,b,c) supplied by the path 201, as well as the following probabilities: $Y_{m-1,n}(a,b)=p(a,b/X_{m-1,n})$ and $Z_{m,n-1}(c,b)=p(c,b/X_{m,n-1})$ determined for all the possible q,a,b,c and in a manner which remains internal to the sub-assembly 300. All these probabilities are stored in a memory 301.

A computation circuit 302 arranged at the output of this memory then performs, for all the possible q,a,b,c, the following determinations in successive enumerated steps:

(1) for each b, the value $F=F_{m-1,n-1}(b)$ is examined which is not taken into account if it is lower than a given threshold, for example $10^{-8}$;

(2) if, in contrast, this value exceeds said threshold, a value H is computed, which is denoted $H_{mn}(q,a,b,c)$ in accordance with expression (16):

$$H=Y_{m-1,n}(a,b) \cdot Z_{m,n-1}(c,b) \cdot p(q/a,b,c) \cdot p_q(x_{mn})/F \quad (16)$$

in which F will be defined and Y and Z have previously been initialized to zero (and then computed in a particular manner explained below for the first row and the first column);

(3) this value of H is added to a value J initialized at zero (this addition is thus an accumulated addition of the values of H) and to a value $L_{m-1,n-1}(b)$ (also initialized at zero) which is equal or proportional to the marginal probability of the label b at the site (m-1,n-1) and is given by the expression (17):

$$L_{m-1,n-1}(b)=\Sigma_{qac}H_{mn}(q,a,b,c) \quad (17)$$

and one returns to step (1) as long as all the labels b have not been treated in a similar manner;

(4) the value thus obtained for J is added to $Y_{m,n}(q,c)$ and to $Z_{m,n}(q,a)$;

(5) after having reset J to zero, the steps (1) to (4) are repeated as long as all the combinations (q,a,c) have not been treated in a similar manner.

When all the combinations (q,a,c) have effectively been taken into account, the computation circuit 302 supplies the values $L_{m-1,n-1}(b)$, $Y_{m,n}(qc)$, $Z_{m,n}(qa)$ for all these combinations. To prevent the variables stored in the memory from getting too small for a precise digital treatment, one proceeds to a normalization operation which in this case consists of determining a norm $N_{m,n}$ defined as the sum of the values $L_{m-1,n-1}(b)$ for all the labels b and of dividing all the values $Y_{mn}(qc)$ and $Z_{m,n}(qa)$ by this norm $N_{m,n}$. Subsequently, the normalized values which are necessary for the subsequent computations are applied from the circuit 302 to the memory 301. As has been evident from the foregoing, the probabilities Y and Z are used in a manner which is internal to the sub-assembly 300 for the computation of H in accordance with expression (16), while the values of $L_{m-1,n-1}(b)$ constitute the output signals of the computation circuit 302.

This circuit 302, which has thus computed values which are equal or proportional to the marginal probabilities of each label for each site, is followed by a circuit 303 for labelling the sites (except those of the first and last rows and the first and last columns which are treated in a particular manner as described below). This labelling of sites is realised by comparing the values of $L_{m-1,n-1}(b)$ and attributing the label b corresponding to the highest value of L to the site (m-1,n-1).

If a site of the first row or the first column is concerned, labelling is not performed but the memory 301 is simply filled progressively (as indicated hereinafter) with the values which are necessary for treating the subsequent rows and columns. For the first site (1,1) the probability of distributing labels is given after normalization by:

$$F_{1,1}(q)=p_q(x_{1,1})/\Sigma_q p_1(x_{1,1}) \quad (18)$$

in which expression $p_q(x_{1,1})$ is equal for all the labels. This value $F_{1,1}(q)$ is stored in the memory 301.

For treating the sites of the first row, the $F_{1,n}(q)$ values are computed on the basis of the following expressions (19) to (22):

$$F'_{1,n}(q)=\Sigma_c Y_{1,n}(q,c) \quad (19)$$

or:

$$F'_{1,n}(q)=\Sigma_c F_{1,n-1}(c) \cdot P^{hor}(q/c) \cdot p_q(x_{1,n}) \quad (20)$$

in which expression (20) $P^{hor}(q/c)$ computed in the first path 201 is given by:

$$P^{hor}(q/c)=\exp((B(h)\cdot d(q,c))-\log(\exp\cdot B(h)+T-1)) \quad (21)$$

As hereinbefore, this computation is followed by a normalization (division by $N_{1,n}=\Sigma_q F'_{1,n}(q)$) which finally leads to:

$$F_{1,n}(q)=F'_{1,n}(q)/\Sigma_q F'_{1,n}(q) \quad (22)$$

For treating the sites of the first column, the $F_{m,1}(q)$ values are computed in a similar manner from the following expressions (23) to (26):

$$F'_{m,1}(q)=\Sigma_a Z_{m,1}(q,a) \quad (23)$$

or:

$$F'_{m,1}(q)=\Sigma_a F_{m-1,1}(a)\cdot P^{ver}(q/a)\cdot p_q(x_{m,1}) \quad (24)$$

in which expression (24) $P^{ver}(q/a)$, also computed in the first path 201, is given by:

$$P^{ver}(q/a)=\exp((B(v)\cdot d(q,a))-\log(\exp\cdot B(v)+T-1))+tm \quad (25)$$

This computation is again followed by a normalization which finally leads to:

$$F_{m,1}(q)=F'_{m,1}(q)/\Sigma_q F'_{m,1}(q) \quad (26)$$

The values of Y,Z,F are preserved in the memory 301 as long as they are wanted so as to be able to realise the subsequent computations.

If a site of the last column is concerned (n=N), the computation circuit 302 evaluates $L_{m-1,n}(a)=\Sigma_q Z_{m,n}(qa)$ and the label which renders $L_{m-1,n}$ maximum is attributed to the site (m-1,N). Similarly, if a site of the last row is concerned (m=M), the computation circuit 302 evaluates $L_{m,n-1}(c)=\Sigma_q Y_{m,n}(qc)$ and the label which renders $L_{m,n-1}$ maximum is attributed to the site (M,n-1). For the site (M,N) the circuit 302 evaluates $L_{m,n}(q)=F_{m,n}(q)$ and the label which renders $L_{m,n}$ maximum is attributed to the site (M,N). The assembly of labels thus supplied by the circuit 303 forms a modified set of labels constituting an update of the initial set of labels.

First and second inputs of a sequencing sub-assembly 400 then receive said initial set of labels and the modified set of labels resulting from the update, and they are first compared in a comparison circuit 410. In accordance with the set of labels which are either different or not different for more than a given number of pixels (for example, 40), a circuit 420 arranged after the circuit 410 commands the discontinuation of the segmentation process (and the set of updated labels is definitively selected) or, in contrast, the substitution of said updated set of labels for the set of initial labels at the input of the two paths 201 and 202. If there is substitution, the sub-assemblies 200 to 400 will be operative again. If, in contrast, this method is discontinued, the operation of the segmentation device according to the invention is terminated and the set of labels thus selected constitutes the definitive output signals for this segmentation device.

It should be noted that the invention is not limited to this embodiment on which variants may be based without departing from the scope of this invention. Particularly in a second embodiment, shown in FIG. 4 and corresponding to a segmentation based on multimodal digital data (i.e. vectors for multimodal observable multimodal data I(x,y)), the segmentation device according to the invention now comprises a sub-assembly 510 for initial segmentation. This sub-assembly 510, which receives said digital data, comprises a unimodal segmentation stage 101 receiving from the M×N×C input data the M×N data which correspond to a single channel. This stage 101 comprises, in series, exactly the same elements as the initial segmentation sub-assembly 100, namely a circuit 11 for extracting the histogram of said M×N data, a circuit 12 for computing average values from T classes corresponding to T image characteristics selected for the segmentation, and a classification circuit 13. This stage 101 is implemented in the same way as the sub-assembly 100 of FIG. 1, and the given M×N labels l(CL), which constitute the (M×N) output signals of the segmentation stage 101, define a first unimodal segmentation of the image.

Figure 4:
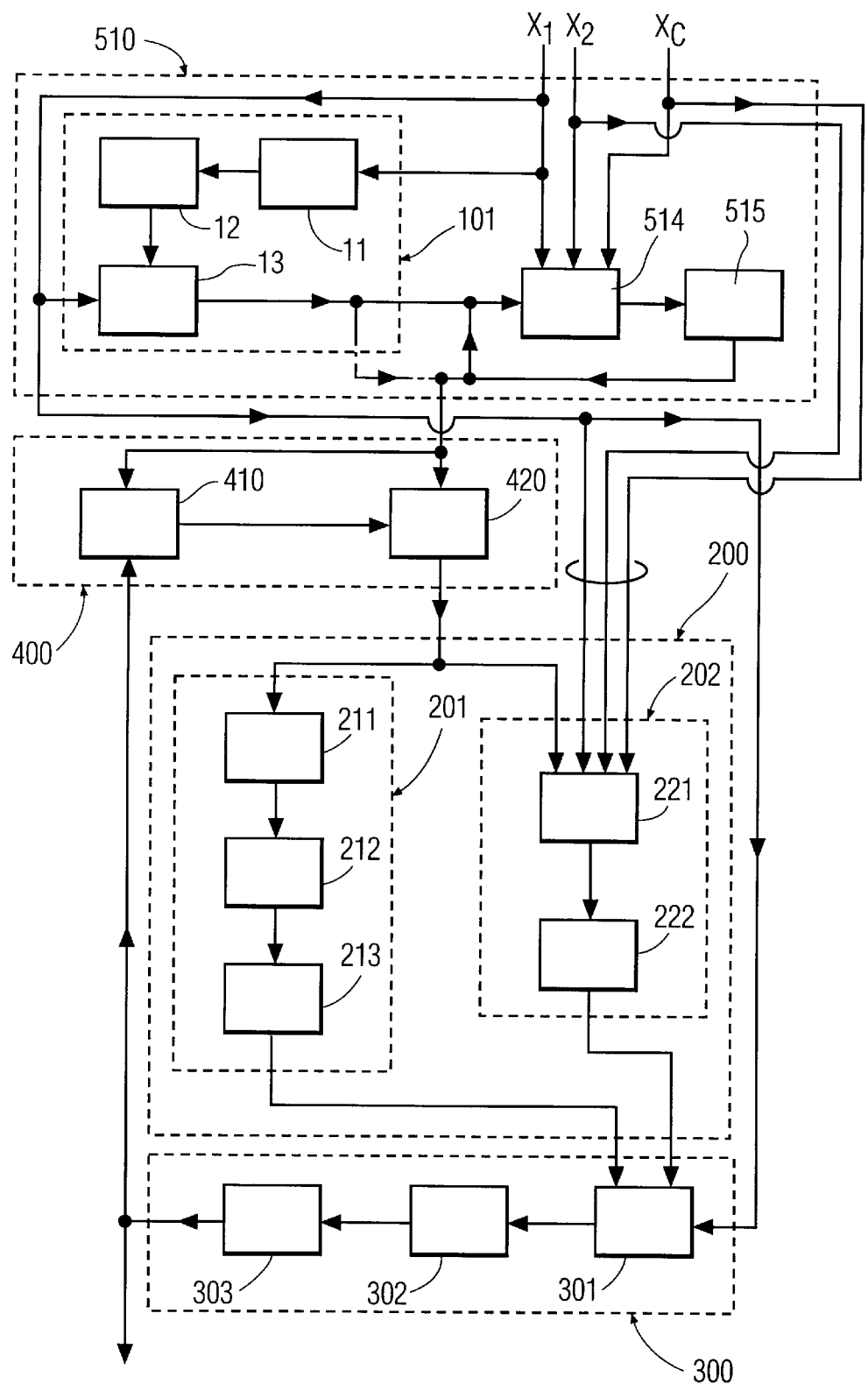

In a first embodiment, this segmentation constitutes the output of the stage 510 (this situation is shown in FIG. 4 by means of the broken-line connection at the output of the circuit 13). In a second embodiment, the stage 101 is followed in series by a sub-assembly for updating this unimodal segmentation, comprising in series a circuit 514 for updating the computation of the average values effected by the circuit 12 and a circuit 515 for updating the classification effected by the circuit 13. The circuit 514, which is identical to the circuit 221 described below, receives the output signals from the classification circuit 13 and the signals associated with the M×N×C input data. The circuit 515 which follows supplies labels which indicate that class to which each pixel belongs in accordance with said initial segmentation. In said second embodiment, this segmentation constitutes the output of the stage 510.

As is shown in FIG. 4, a third embodiment of the stage 510, this time operating in an iterative manner, ensures that the output signal of the sub-assembly for updating the unimodal segmentation is applied to its input (i.e. the output signal of the circuit 515 is applied to the input of the circuit 514). Thus, after computation of the average values of each class separately (by taking pixels into account which belong to this class, using formulas equivalent to expression (15)), and subsequent classification of the pixels of the image following the C channels by means of a criterion such as that for a minimum distance, it is possible to obtain a new classification of pixels. This process may be repeated until convergence to, for example, a minimum value of the distance. This segmentation constitutes the output of the stage 510 in its third embodiment.

The initial segmentation sub-assembly 510 is followed, in series, by the sub-assembly 200 for updating the probabilities, which, as hereinbefore, receives the input signals of the device and the (M×N) labels determined by the sub-assembly 510, and supplies the conditional probabilities p(q/abc) and $p_q(x)$. Similarly as in FIG. 1, the sub-assembly 200 comprises the first and second paths 201 and 202 which are identical to the embodiment already described, except for the circuit 221 for computing the class parameters.

In a first variant, the circuit 221 computes the average values and the variances, independently for each channel. The average values, denoted $M2_{qj}$, are given by the following expression (27):

$$M2_{qj}=\Sigma_{(s/l(s)=q)} x_{sj}/Nq \quad (27)$$

in which j=1 to C is the channel index, $x_{sj}$ is the level of the value for the channel j at a given site s, l(s) is the label attributed to this site s, and Nq is the total number of sites to which the label q is attributed. Here, the variances V are given by the following expression (28):

$$V^2_{q,j}=\Sigma_{(s/l(s)=q)}(x_{sj}-M2_{qj})^2/Nq \quad (28)$$

In another variant, the set of class parameters comprises, in addition to the average values $M2_{qj}$, the elements of the matrix of co-variances for the different channels, which are given by the following expression (29):

$$V_{qj1,j2}=\Sigma_{(s/l(s)=q)}(x_{sj1}-M2_{qj1})(x_{sj1}=M2_{qj2})/Nq \quad (29)$$

In either of these variants, and similarly as hereinbefore, the values M2 and V thus computed are the 2T output signals of the circuit 221.

These signals are applied to the circuit 222 for determining the conditional probability. In the first variant of the circuit 221, this conditional probability $p_q(x)$ is given for each class by the following expression (30):

$$p_q(x) = \frac{1}{\sqrt{2\pi} \prod_{j=1}^{j=D} V_{q,j}} \exp\left(-0.5 \sum_{j=1}^{j=D} \frac{(x_j - M2_{q,j})^2}{V_{q,j}^2}\right) \quad (30)$$

In the second variant of the circuit 221, the conditional probability determined by the circuit 222 is this time given for each class by the following expression (31):

$$p_q(x) = \frac{1}{\sqrt{2\pi} \det(V_{q,j1j2})} \exp\left(-0.5 \sum_{j=1}^{j=D} (x_{j1} - M2_{q,j1}) b_{q,j1j2} (x_{j2} - M2_{q,j2})\right) \quad (31)$$

in which expression (31) $b_{qj1j2}$ is the inverse matrix of $V_{qj1j2}$. In either case, the output conditional probabilities of the two paths 201 and 202, present at the output of circuits 213 and 222, constitute the output signals of the sub-assembly 200 applied to the two inputs of the sub-assembly 300 for labelling the pixels. This sub-assembly 300 and the sequencing sub-assembly 400 are not modified with respect to the embodiment of FIG. 1.

What is claimed is:

1. A device for segmenting a discrete assembly of data corresponding to sites (m,n), with m being between 1 and M inclusive and n being between 1 and N inclusive, based on digital input signals corresponding to said data, characterized in that it comprises, in series:

(A) a sub-assembly for initial segmentation by extracting the histogram of said digital input signals, computing the average values from T classes and classification by searching that average value which is most approximate to a digital input signal being processed thereby producing a set of initial labels;

(B) a sub-assembly for determining and updating probabilities, receiving said labels on the one hand and said digital input signals on the other hand and comprising:

(1) at the output of said initial segmentation sub-assembly, a first path for determining conditional probabilities p(q/a,b,c), comprising in series:

(a) a circuit for determining configuration probabilities interpreting the identity or non-identity of the levels corresponding to each of the fifteen possible configurations within a bidimensional square model (q,a,b,c) of a Markov chain, q being referred to in said initial segmentation sub-assembly as the label to be determined at the "infant" site and a, b, c being referred to as the labels of the "parent" sites;

(b) a circuit for computing propagation coefficients for the Markov chain model thus chosen;

(c) a first circuit for determining conditional probability p(q/abc)=exp L(q/abc)/Z(abc), in which Z is a normalization factor and in which L(q/abc) is a factor propagating the influence from the parents to the infants, defined by the expressions (3) to (14):

$$L(q/abc) = B(v) \cdot d(qa) + B(d) \cdot d(qb) + B(h) \cdot d(qc) + \quad (3)$$
$$B(v,d) \cdot d(qab) + B(d,h) \cdot d(qbc) +$$
$$B(v,h) \cdot d(qac) + B(v,d,h) \cdot d(qabc)$$

$$\exp B(v) = k \cdot S(1123) \quad (4)$$

$$\exp B(d) = k \cdot S(1213) \quad (5)$$

$$\exp B(h) = k \cdot S(1231) \quad (6)$$

$$\exp B(v,d) = c(v,d) \cdot (\exp \cdot B(h) + T - 2) \cdot \exp(B(v) + B(d)) \quad (7)$$

$$\exp B(v,h) = c(v,h) \cdot (\exp \cdot B(d) + T - 2) \cdot \exp(B(v) + B(h)) \quad (8)$$

$$\exp B(d,h) = c(d,h) \cdot (\exp B(v) + T - 2) \cdot \exp(B(d) + B(h)) \quad (9)$$

-continued $$\exp B(v,d,h) = \frac{(T-1) \cdot S(1111)/S(1222)}{\exp(B(v) + B(d) + B(h) + B(v,d) + B(v,h) + B(d,h))} \quad (10)$$

$$c(v,d) = S(1112)/(S(1221) + S(1223)) \quad (11)$$

$$c(v,h) = S(1121)/(S(1212) + S(1232)) \quad (12)$$

$$c(d,h) = S(1211)/(S(1122) + S(1233)) \quad (13)$$

$$k = (T - 3)/S(1234); \quad (14)$$

(2) also at the output of the initial segmentation sub-assembly and in parallel with the first path, a second path for determining conditional probabilities $p_q(x_{mn})$, comprising in series:

(a) a circuit for computing "average" parameters and "variance" parameters of said T classes, (b) a second circuit for determining conditional probabilities;

(C) at the output of said sub-assembly for determining and updating probabilities, a sub-assembly for labelling pixels of said assembly of data, receiving the output signals of said first and second paths at first and second inputs and the digital input signals of the device at a third input, a circuit being provided to supply a new set of labels which constitutes the update of said initial segmentation;

(D) between the two sub-assemblies for initial segmentation and determining and updating probabilities, a sequencing sub-assembly whose first and second inputs receive the set of initial labels obtained in accordance with said initial segmentation and the set of labels resulting from the update, respectively, and comprising in series:

(1) a circuit for comparing said sets of labels;

(2) in accordance with the result of said comparison, a circuit for discontinuing the process of segmentation or, in contrast, for a new update, for substituting said updated set of labels for said initial set of labels, said updated set of labels being applied to the input of said first and second paths.

2. A segmentation device as claimed in claim 1, characterized in that said discrete assembly comprises unimodal data, and in that the initial segmentation sub-assembly receiving said input signals comprises in series:

(1) a circuit for extracting the histogram of levels wherein each level has a value expressed by each of said input signals and corresponds to each point of said assembly;

(2) based on said histogram, a circuit for computing the average values from T classes corresponding to T previously selected characteristics of said assembly, the predetermined number T being supplied to said computation circuit;

(3) a circuit for classifying by searching for all the points of said assembly that average value of the T computed average values which is the most approximate to the level of each point and corresponding regrouping of said points, said classification circuit supplying labels which indicate the class to which each point belongs in accordance with said initial segmentation.

3. A segmentation device as claimed in claim 1, characterized in that said discrete assembly comprises multimodal data for which the digital input signals corresponding to said data are regrouped in C channels, and said initial segmentation sub-assembly receiving said input signals comprises in series:

(1) a unimodal segmentation stage receiving, among said input signals, the signals associated with M×N data which correspond to one of the C channels, and comprising in series:
  (a) a circuit for extracting the histogram of levels wherein each level has a value expressed by each of said input signals and corresponds to each point of said assembly;
  (b) based on said histogram, a circuit for computing the average values from T classes corresponding to T previously selected characteristics of said discrete assembly, the predetermined number T being supplied to said computation circuit;
  (c) a circuit for classifying by searching, for all the points of said discrete assembly, that average value of the T computed average values which is most approximate to the level of each signal associated with the data corresponding to each point and subsequently by corresponding regrouping of said points, said classification circuit supplying labels which indicate that class to which each point belongs in accordance with the unimodal segmentation;

(2) a sub-assembly for updating said unimodal segmentation, comprising in series:
  (a) a circuit for updating said computation of average values from the T classes, receiving the output signals from said classification circuit and the signals associated with the M×N×(C-1). other data corresponding to the (C-1) other channels;
  (b) a circuit for updating said classification, supplying labels which indicate that class to which each point of said discrete assembly belongs in accordance with the initial segmentation.

4. A segmentation device as claimed in claim 3, characterized in that the "variance" parameters are defined by the expression:

$$V^2_{qj} = \Sigma_{(s/l(s)=q)}(x_{sj} - M2_{qj})^2 / Nq$$

in which j=1 to C is the channel index, $x_{sj}$ is said level of the value for the channel j at a given site s, l(s) is the label attributed to this site s, $M2_{qj}$ is the average of each channel j independently, and Nq is the total number of sites to which the label q is attributed.

5. A segmentation device as claimed in claim 3, characterized in that the "variance" parameters are the elements of the matrix of co-variances for the different channels, defined by the following expression:

$$V_{qj1j2} = \Sigma_{(s/l(s)=q)}(x_{sj1} - M2_{qj1})(x_{sj1} - M2_{qj2}) / Nq$$

in which j1,j2 denotes the indices of the two channels concerned, $x_{sj}$ is said level of the value for the channel j at a given site s, l(x) is the label attributed to this site s, $M2_{qj}$ is the average of each channel j considered independently, and Nq is the total number of sites to which the label q is attributed.

6. A segmentation device as claimed in claim 4, characterized in that the output signal of the sub-assembly for updating the unimodal segmentation is applied to its input so as to realise a new classification, until this iterative process is interrupted in accordance with a given convergence criterion.

7. A segmentation device as claimed in claim 1, characterized in that the labelling sub-assembly comprises in series:

(1) a memory for conditional probabilities supplied by said first and second paths and intermediate probabilities determined internally to said labelling sub-assembly;

(2) a circuit for computing values which are equal or proportional to the marginal probabilities of each label for each site, said computation being performed in accordance with the following steps, for all the possible q, a, b, c:
  (a) $F_{m,n(q)}$ is defined as the conditional probability $p(q/X_{mn})$ of having a label q at the site (m,n), the reference $X_{mn}$ designating the assembly of sites situated above and at the left of the site (m,n);
  (b) for each b, the value $F = F_{m-1,n-1}(b)$ is examined only for taking into account whether it is higher than a given threshold;
  (c) then the following expression is computed:

$$H = Y_{m-1,n}(a,b) \cdot Z_{m,n-1}(c,b) \cdot p(q/a,b,c) \cdot p_q(x_{mn}) / F$$

in which:

$$Y_{m-1,n}(a,b) = p(a,b/X_{m-1,n})$$

and:

$$Z_{m,n-1}(c,b) = p(c,b/X_{m,n-1})$$

and an accumulated addition of the values of H is effected for obtaining a value J and a value $L_{m-1,n-1}(b)$;
  (d) the steps (b) and (c) are repeated until all the sites have been treated in a similar manner, the cumulated value of J being added to $Y_{m,n}(q,c)$ and to $Z_{m,n}(q,a)$ and subsequently reset to zero, and the cumulated value of $L_{m-1,n-1}(b)$ constituting said value which is equal or proportional to the marginal probability of the label b at the site (m-1,n-1);
  (e) the steps (b) to (d) are repeated until all the combinations (q,a,c) have been treated in a similar manner;

(3) a circuit for labelling sites by comparing the values of $L_{m-1,n-1}(b)$ and attributing to each site (m-1,n-1) the label b corresponding to the largest value of $L_{m-1,n-1}(b)$.

8. A segmentation device as claimed in claim 7, characterized in that in the circuit for computing values which are equal or proportional to the marginal probabilities of each label for each site, step (c) includes a supplementary normalization step ($c_2$) by dividing all the values of $Y_{m,n}(q,c)$ and $Z_{m,n}(q,a)$ by a norm $N_{m,n}$ which for all the labels b is equal to $\Sigma_b L_{m-1,n-1}(b)$.

* * * * *